Aug. 1, 1950 W. D. KIMBALL ET AL 2,516,998
BOTTLE DELABELING APPARATUS
Filed Feb. 15, 1944 7 Sheets-Sheet 6

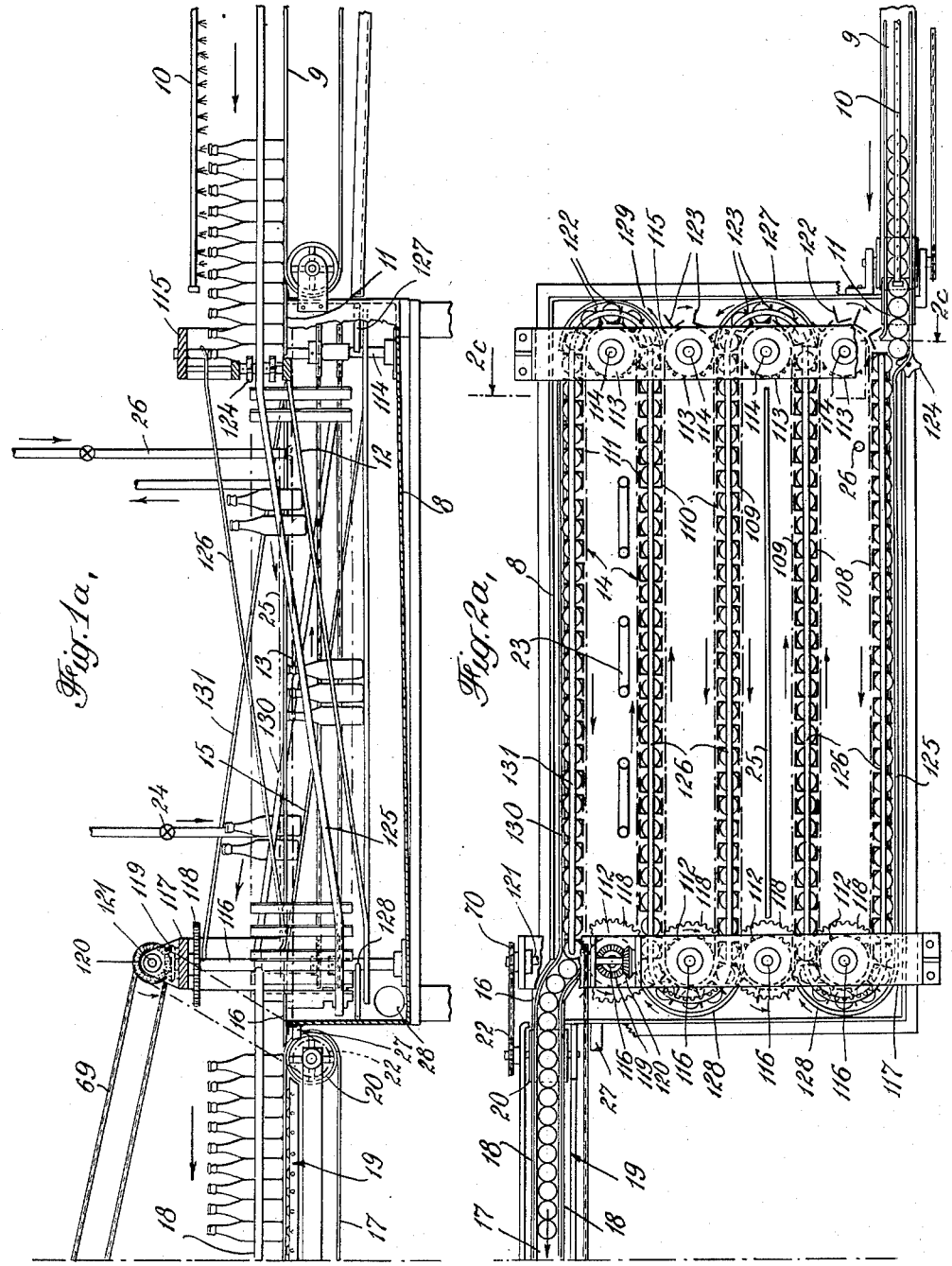

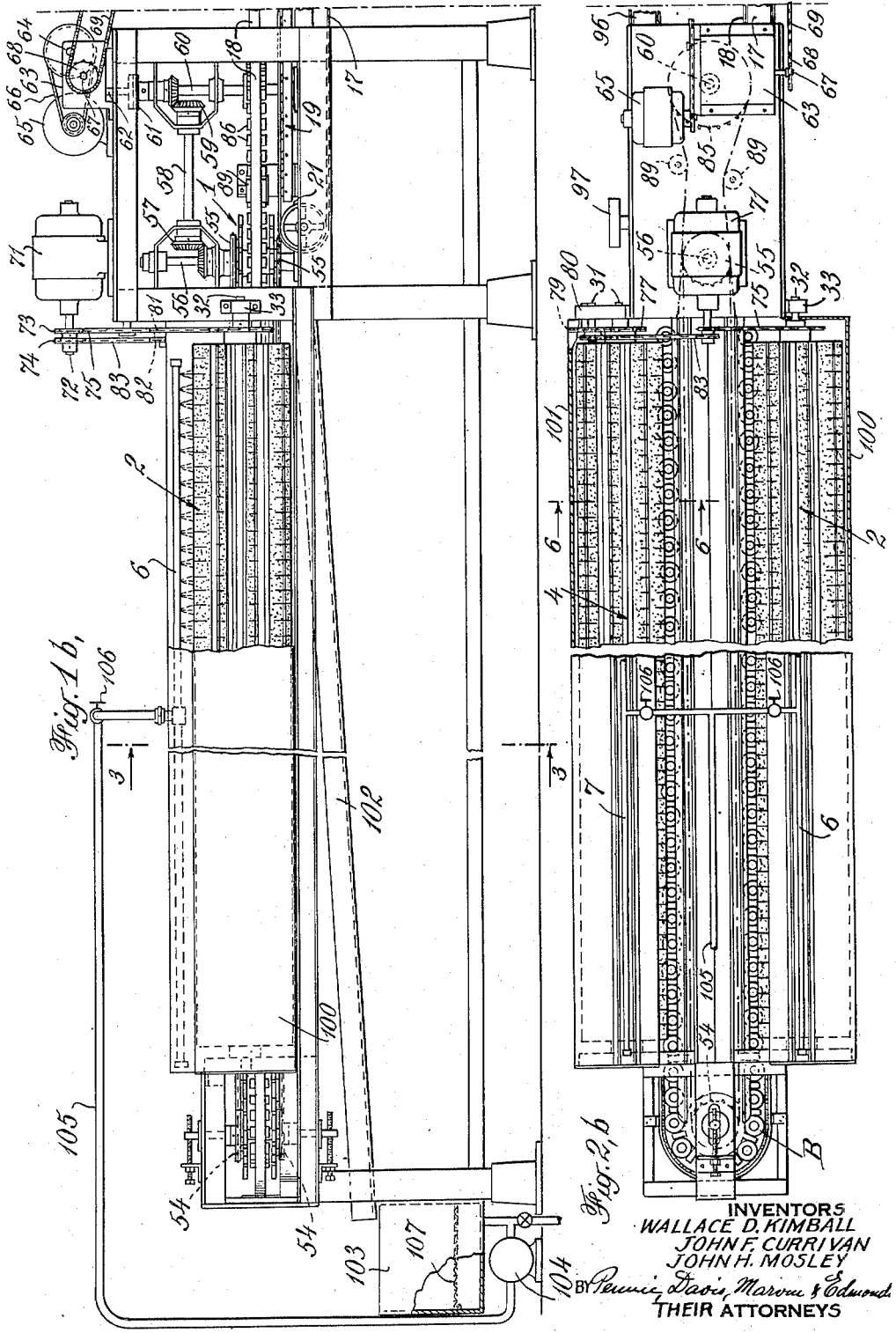

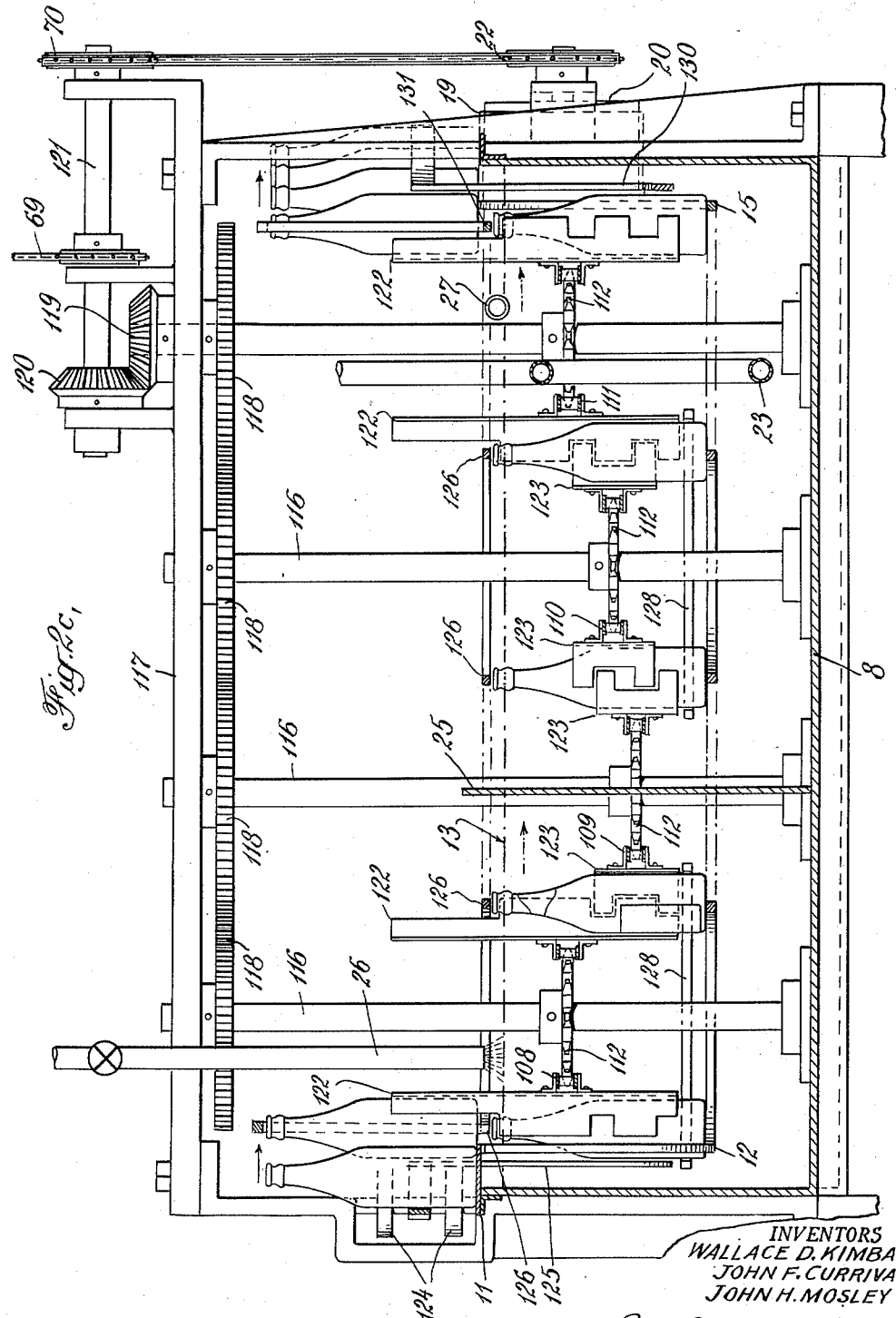

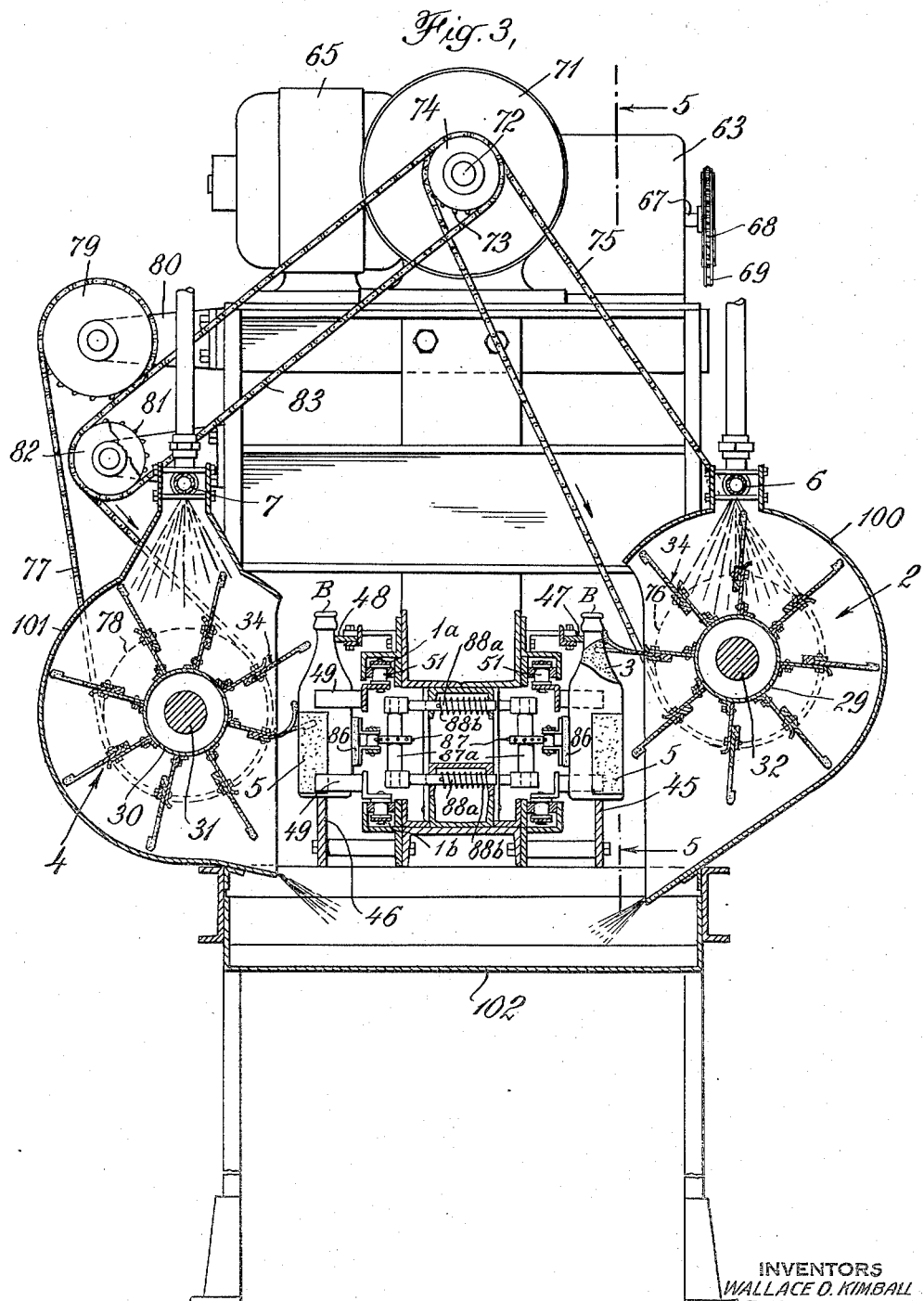

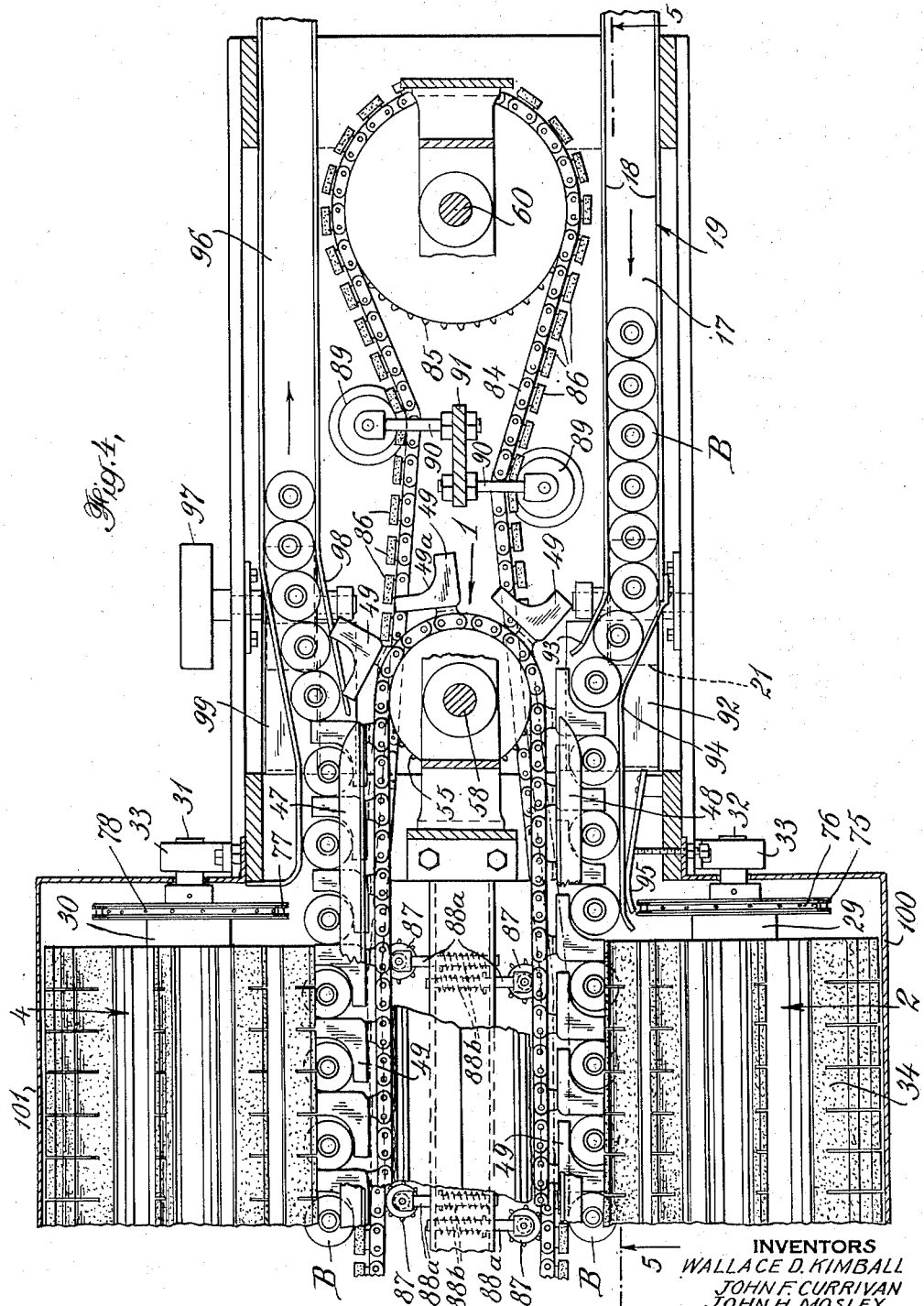

INVENTORS
WALLACE D. KIMBALL
JOHN F. CURRIVAN
JOHN H. MOSLEY
BY Pennie, Davis, Marvin & Edmonds
THEIR ATTORNEYS INVENTORS
WALLACE D. KIMBALL
JOHN F. CURRIVAN
JOHN H. MOSLEY
BY Pennie, Davis, Marvin & Edmonds
THEIR ATTORNEYS Patented Aug. 1, 1950

2,516,998

UNITED STATES PATENT OFFICE 2,516,998

BOTTLE DELABELING APPARATUS

Wallace D. Kimball, Middle Haddam, John F. Currivan, East Hampton, and John H. Mosley, Portland, Conn., assignors, by mesne assignments, to Hartford-Empire Company, Hartford, Conn., a corporation of Delaware Application February 15, 1944, Serial No. 522,522

19 Claims. (Cl. 15—101)

This invention relates to apparatus for delabeling bottles and the like and has for its general object the provision of improved apparatus for removing labels from used bottles which have been returned to the bottling plant for washing and refilling.

In preparing for refilling with beverages and food products, it is customary to process the bottles in an appropriate apparatus. Most state laws require such bottles to be treated for specified lengths of time in suitable cleansing solutions, such, for example, as a solution of caustic soda, for the purpose of cleaning the interiors of the bottles, the labels being removed as an incident to such treatment. This is customarily accomplished in a bottle-cleaning or washing machine, the bottles usually being carried through a plurality of chambers, during which movement they are soaked in the various solutions. They also may be brought into engagement with revolving brushes for internal and external scrubbing. Labels, and frequently paper napkins and other substances, adhere to the bottles causing a collection of sludge which interferes with the action of the cleansing solutions necessitating frequent and costly replacement.

The present invention aims to reduce the cost of preparing such bottles for reuse, the object being to provide an apparatus for removing the labels and all material adhering to the outside surfaces of the bottles prior to their entrance into the bottle washing or cleaning machine. The useful life of the expensive cleansing solutions used in the washing machine is thereby lengthened, and the frequency of replacement of such solutions and the loss of time during shut downs of the equipment for such replacement are lessened.

Another object of the invention is to provide an apparatus which, with the application of a comparatively small amount of water to soften the labels, will remove the greater portion of the labels and other matter from the exterior surfaces of the bottles.

Another object of the invention is to provide an apparatus which, with the labels subjected to a short presoftening treatment in a pre-softening liquid, such as water, will effectively remove all traces of the labels and other matter adhering to the bottles.

Another object of the invention is to provide an apparatus in which the label softening and removing operations are carried out as a continuous process, the bottles moving continuously without interruption.

Another object of the invention is to provide an apparatus of this kind which is adapted simultaneously to remove the labels from two label areas of the bottles, such for example, as labels on the body and those on the neck portions of the bottles.

A further object of the invention is to provide an apparatus for delabeling bottles in which, during the label removal, the bottles do not come in contact with metal other than the support on which they slide, thereby reducing breakage and surface scratches to a minimum.

The invention will be understood from a consideration of the accompanying drawings which serve to illustrate one embodiment of the invention by way of example.

In these drawings:

Fig. 1b is a side elevation of the improved label removing apparatus;

Fig. 1a is a vertical longitudinal section through an immersing tank which is preferably, but not necessarily, employed to pre-soften the labels;

Fig. 2a is a plan view of the apparatus shown in Fig. 1b;

Fig. 2a is a plan view of the apparatus shown in Fig. 1a;

Fig. 2c is a vertical cross section of the immersing tank taken on line 2c—2c of Fig. 2a looking in the direction of the arrows;

Fig. 3 is a vertical transverse section taken on the plane indicated by line 3—3 of Fig. 1b looking from the left in the direction of the arrows and drawn to an enlarged scale;

Fig. 4 is a horizontal longitudinal section, also drawn to an enlarged scale and taken on the plane indicated by line 4—4 of Fig. 5, showing that part of the apparatus which is at the right hand end as shown in Fig. 2;

Figure 5:
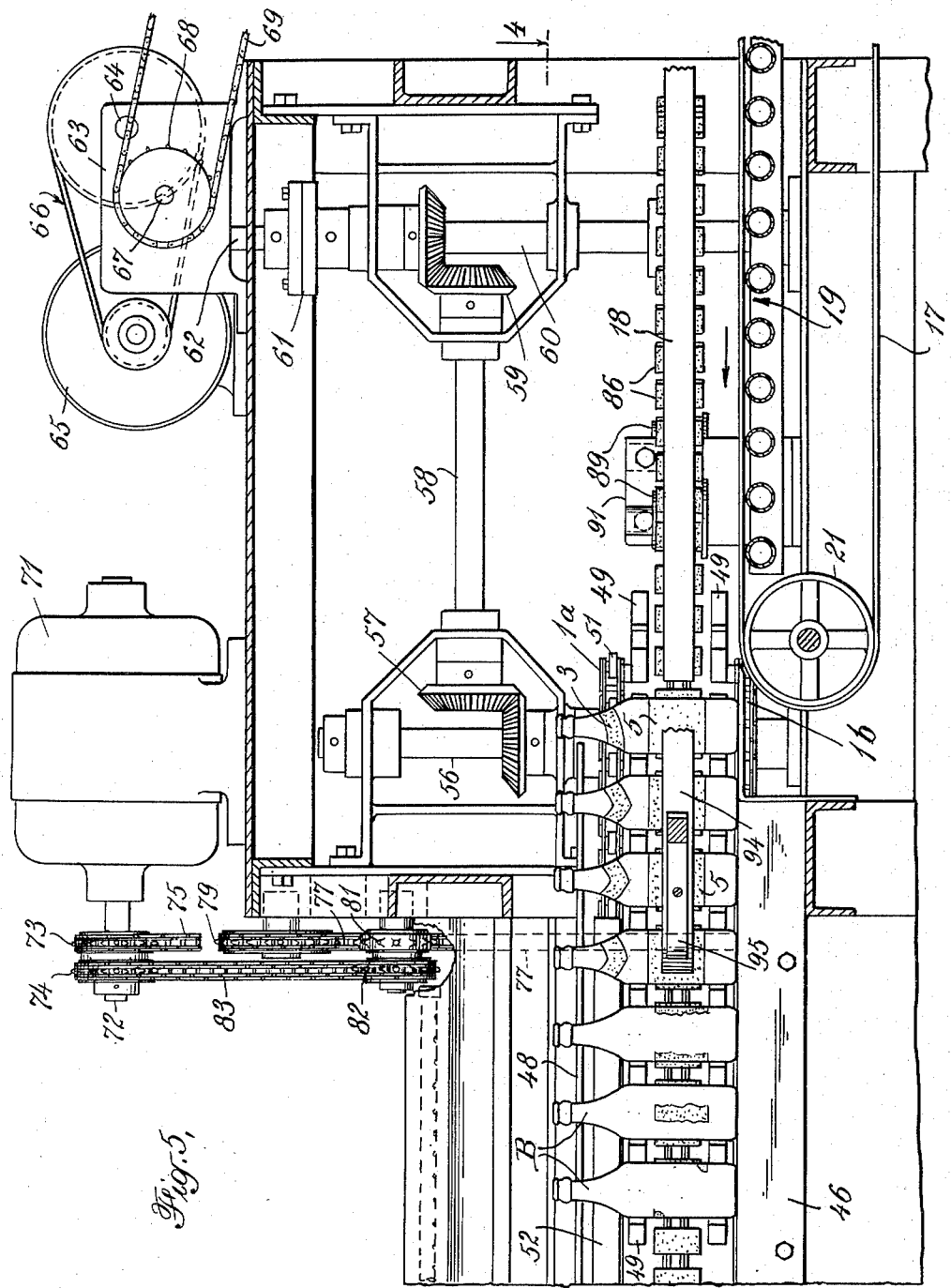
Fig. 5 is a vertical longitudinal section taken on the plane indicated by line 5—5 of Fig. 4 and drawn to the same enlarged scale.

Referring now to the accompanying drawings, and first considering briefly the general arrangement of the apparatus as shown in Figs. 1b, 2b and 3, the bottles B to be delabeled are advanced by a continuously moving endless conveyor indicated generally by reference numeral 1. They move into a somewhat prolonged engagement with a rotating elongated rotary scrubber. This device, indicated generally by reference numeral 2, preferably consists of a wiping rotor having stiff but yieldable, resiliently acting blades which produce a mechanical abrading, rubbing or wiping action. Such rotary scrubber acts upon the neck labels 3 as the bottles move to the left, as shown in Fig. 2, along the front side of conveyor 1.

The bottles then move beyond the left hand end of the rotary scrubber or wiping rotor 2 and around the left end of endless conveyor 1 and into a similar prolonged engagement with a second elongated rotary scrubber indicated generally by reference numeral 4. This is identical with rotary scrubber 2 but is positioned at a lower elevation so that it acts upon the body labels 5. During all of this time the bottles are continuously rotated about their own axes to subject all sides to the scrubbing or wiping action.

The labels are softened by the application of a suitable softening liquid, such, for example, as water which may be applied either during or previous to the action upon the labels of the rotary scrubbers or wiping rotors 2 and 4. The softening liquid which is applied during the operation of the wiping rotors or scrubbers on the bottles and labels is supplied in the form of a spray, one sprayer, indicated by numeral 6, being directed at the right hand label removing mechanism and a second sprayer 7 at the left hand mechanism.

Operating in this manner the apparatus will remove substantially 80% of the labels from the surfaces of the bottles. By pre-softening the labels by immersion in a softening liquid such as water for a period of about two minutes prior to the subjection of the bottles to the wiping action of wiping rotors 2 and 4, these rotors will entirely remove the labels leaving no trace of them on the bottles. Sprayers 5 and 6, however, are preferably kept in operation in order to overcome the frictional drying effect of the blades of the wiping rotors on the bottles.

The immersion or pre-soaking of the bottles takes place in an immersion tank 8 shown in Figs. 1a, 2a and 2c. The bottles are carried through this tank in upright position, and hence the tank is shallow, being only of sufficient height to permit the bottles to be immersed sufficiently to cover the neck labels, and to provide space at the bottom for the collection of sludge.

The bottles are supplied to tank 8 on an endless conveyor 9 above which there is preferably provided a liquid spraying device 10 to partially fill the bottles to facilitate their immersion in the soaking liquid in tank 8. The bottles pass from conveyor 9 over a scuff plate 11 and onto a downwardly inclined supporting rail 12, along which the bottles descend until their neck labels are below the level 13 of the liquid in tank 8.

In the example shown the bottles make five passes from end to end of tank 8 as indicated in Fig. 2a, but it will be understood that the number of passes may be varied to suit the required time of immersion, the available space and other considerations. The bottles are carried through the tank on a series of conveying devices which may be referred to collectively as the tank conveyor 14, and on reaching the discharge side of tank 8 are moved along an upwardly inclined rail 15 which elevates the bottles above the top of the tank. They then pass over a scuff plate 16 onto a feeding or transfer conveyor 19 between guide bars 18.

Conveyor 19 comprises a smooth surfaced endless belt 17 supported on a driving roll 20 and an idler roll 21, the latter being journaled in the frame of the label removing apparatus (see Fig. 1b). Transfer conveyor 19 is driven by means of a chain 22 passing around a sprocket on the shaft of driving roll 20.

Tank 8 may be provided with a heating coil 23 under the control of a supply valve 24 for a suitable heating agent, such as steam. In localities where cold weather is encountered during a part of the year it is desirable to avoid plunging the cold bottles, which perhaps contain ice, directly into hot water, in order to prevent breakage. Accordingly, tank 8 may be provided with a vertical partition 25. Heating coil 23 is arranged to heat the liquid in tank 8 at the rear of partition 25 only so that the bottles will not be immersed in heated water until they reach this part of the tank.

The liquid within the compartment in front of partition 25 will be relatively cool particularly as water supply pipe 26 may be arranged to deliver cold fresh water to this compartment. The colder water from the front compartment flows around the ends of partition 25 into the rear compartment and an outlet pipe 27 in this compartment at the upper left hand corner (Fig. 1a) maintains the level of the liquid in both compartments. A certain amount of sludge will form in tank 8 and an outlet 28 may be provided through which the sludge may be periodically or continuously removed.

The details of the construction of tank conveyor 14 will be given after completing the description of the delabeling apparatus of Figs. 1b and 2b.

The frame of the label removing apparatus shown in Figs. 1b and 2b is built up of structural steel shapes. At its right hand end it supports the driving mechanism, the feed and delivery conveyors and the right hand end bearings for the two elongated rotary scrubbers or wiping rotors. It has a lengthwise portion to support the bottle conveyor structure and the left end bearings for the rotary scrubbers.

The length of rotary scrubbers or wiping rotors 2 and 4 may vary to some extent but is in the neighborhood of 12 or 15 feet. Consequently, in order to obtain the required rigidity the shafts 29 and 30 of wiping rotors 2 and 4 are constructed of hollow steel tubes several inches in diameter. They are also reinforced by the blade supports as will appear shortly. These tubes are plugged at each end and fitted with bearing shafts 31 and 32 of reduced diameter adapted to turn in journal brackets such as indicated at 33 in Figs. 1b and 2.

Figure 6:
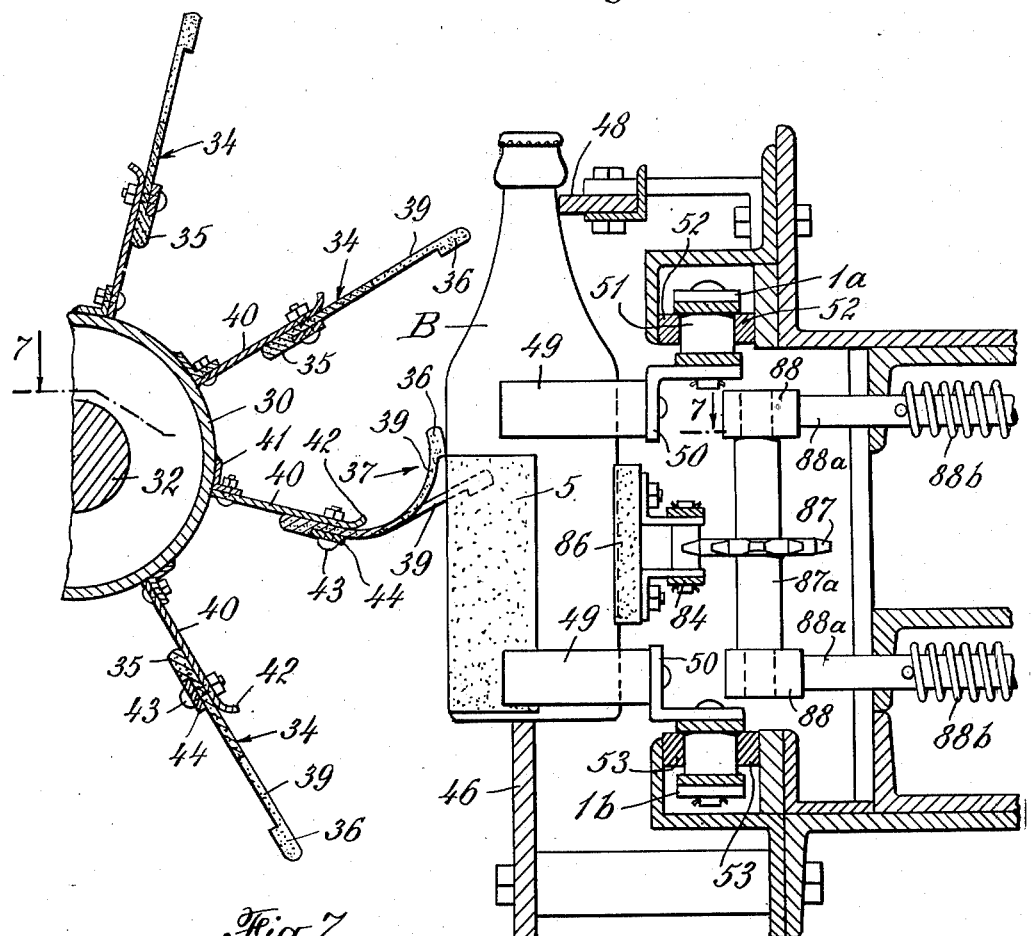
Fig. 6 is a detailed vertical transverse section showing by means of a greatly enlarged scale some of the parts illustrated in Fig. 3.
Figure 7:
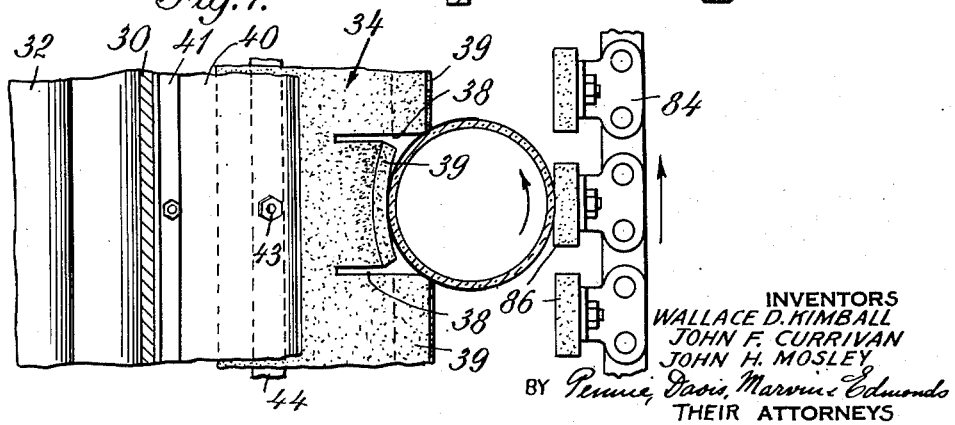
Fig. 7 is a fragmentary horizontal section taken on broken line 7—7 of Fig. 6.

The wiping blades (Fig. 6) of each of the wiping rotors 2 and 4 may be made of extremely heavy woven fabric, such as canvas. They are in the neighborhood of ⅜ of an inch in thickness and are preferably provided with ribs 35 and 36 along both their inner and outer edges. This material, while of sufficiently yielding nature so that the blades will bend to approximately the position shown at 37 in Figs. 6 and 7, is extremely stiff so as to exert a hard rubbing action against the surfaces of the bottles. The blades are resiliently acting, although it is not necessary that the blade material be inherently resilient because the wiping rotors are operated at such a rotative speed that the centrifugal force acting on the blades is sufficient to return them to their radial position after passing position 37 and leaving contact with the bottles.

The inner corners or edges of the outer ribs 36 exert a stripping, tearing or shearing action on the upper edges of the labels, as indicated in Fig. 6, which supplements the mere friction or rubbing action of the blades against the labels.

As shown in detail in Fig. 7, blades 34 are provided with equally spaced transverse cuts or slots 38 which divide each blade from end to end into a series of tongues or narrow blades 39. The width of these narrow blades is somewhat less than the diameter of the bottles so that when one of the tongues is opposite the center of the bottle, the corners of the adjacent tongues (see Fig. 7) will engage the surface of the bottle. This has the effect of causing the blades to engage a longer arcuate surface on each bottle than if the slots 38 were omitted and the blades were continuous.

The inner ribs 35 are for the purpose of assisting in attaching the inner margins of the blades to their supports 40. These supports consist of wide strips or continuous vanes of heavy gauge metal radially mounted by any suitable means such as the angle bars 41 on the surface of the tube shafts 29 and 30. Thus the radial vane-like blade supports 40 serve to increase the diameter of the wiping rotors so as to cause the outer edges of blades 34 to move in a comparatively flat arc as they sweep the surface of the bottles, thereby maintaining the blades in effective contact with the bottles for a considerable vertical distance. They also serve materially to strengthen and rigidify the two rotor shafts 29 and 30.

The outer margins of supports 40 are preferably curved backwardly as shown at 42 to prevent cutting into the blades when the blades are bent to their extremely curved position as indicated at 37 in Fig. 6. The blades are removably secured to the outer margins of supports 40 by means of bolts 43 which pass through spaced holes in the blades in metal strips 44 which extend from end to end of supports 40. The inner edges of strips 44 engage the ribs 35 thus providing a continuous line of attachment throughout the length of the blades which is desirable in view of the very considerable centrifugal force to which the blades are subjected.

To properly support the bottles against the vigorous action of the rotating blades, they are caused to slide in upright position on rigid supporting rails 45 and 46 which form a part of conveyor 1. These rails each consist of a relatively thin but deep metal bar. They are mounted as shown in Figs. 3 and 6 on the central frame of the apparatus which extends substantially throughout its entire length. The reaction of the pressure of the wiping blades is taken in part by means of two non-metallic neck rails 47 and 48. These rails are mounted on the upper part of the central frame and extend throughout the lengths of the two wiping rotors 2 and 4, respectively.

Conveyor 1 comprises two parallel endless chains, an upper chain 1a and a lower chain 1b, having L-shaped pocket fingers 49 secured to them and maintained by the chains in vertical alinement to form individual bottle pockets. The lateral legs of fingers 49 are thicker than the longitudinal and suitably space the bottles apart to obtain the most effective action of the wiping blades in removing the labels. Such spacing is indicated to be about one-half the diameter of the bottles. Pocket fingers 49 also are filleted as indicated at 49a in Fig. 4 to increase their strength and to form a rounded seat against which the bottles may be received as they are fed into conveyor 1 from the transfer conveyor 19.

Pocket fingers 49 are preferably made of a tough non-metallic material which has a degree of resiliency providing a cushioning effect with the surfaces of the bottles. Neck rails 47 and 48 are also preferably made of the same material. A material known as "Micarta" has been found well adapted for this purpose and is preferred. This material consists of layers of woven cotton fabric united under heat and pressure by means of a phenolic condensation product such as "Bakelite."

With this construction the bottles are not in contact with metal, other than the supporting rails 45 and 46, during the entire time that they are subjected to the delabeling action of the rotating wiping blades. The liability of bottle breakage is in this way reduced to a minimum.

The pocket fingers 49 are mounted on alternate links of each of the chains 1a and 1b by means of supports 50 which are formed integral with such links. Chains 1a and 1b are of the roller type having rollers 51. These chains are supported and guided between upper and lower pairs of tracks 52 and 53, respectively. These tracks are constructed as a part of the central frame of the apparatus and extend throughout the length of the wiping rotors 2 and 4. They confine the conveyor chains to hold the bottles firmly on rails 45 and 46 to receive the action of the rotating blades 34.

Conveyor chains 1a and 1b are supported at the left hand end by a pair of idler sprockets 54 which rotate on a supporting shaft mounted in the apparatus frame and adjustable as indicated in Fig. 1b to take up slack in the conveyor. At their right hand ends conveyor chains 1a and 1b pass over a pair of driving sprockets 55 which are keyed to the vertical driving shaft 56 journaled in suitable brackets attached to the machine frame.

This shaft is driven through beveled gearing 47, a horizontal shaft 58 and beveled gearing 59 from a second vertical shaft 60. The upper end of shaft 60 is drivingly connected by means of a coupling 61 with an output shaft 62 of a reducing gearing 63 mounted on top of the machine frame. Input shaft 64 of this gearing is driven by an operating motor 65 through a belt drive indicated generally by numeral 66.

Reducing gear mechanism 63 is provided with a second and horizontal output shaft 67 on which is a sprocket 68, and the tank conveyor 14 of the immersing tank is driven from this sprocket by means of a chain 69 which is trained around a sprocket 70 which is a part of the driving mechanism of tank conveyor 14, to be described. In this way conveyor 14 and the pocket conveyor 1 of the label removing apparatus are driven by the same operating motor 65 and it will be understood that the arrangement is such that these two conveyors move at the same linear speed.

Referring now to Figs. 3, 4 and 6, the two wiping rotors 2 and 4 are driven by a second operating motor 71 by means of the chain drive mechanism illustrated. Shaft 72 of motor 71 has keyed to it two driving sprockets 73 and 74. Wiping motor 2 is driven from this sprocket by means of a chain 75 which passes around a larger sprocket 76 fixed near the right hand end of wiping rotor shaft 29. The rotation of motor shaft 72 being counterclockwise, wiping rotor 2 rotates in the same direction.

Wiping rotor 4, however, rotates in the clockwise direction necessitating a different arrangement. A chain 77 passes around a sprocket 78 on wiping rotor shaft 30 of the same size as sprocket 76. This chain passes around an idler sprocket 79 which is mounted on a bracket 80 fixed near the top of the machine frame, and thence the outside or back of chain 77 passes around a sprocket 81 which is mounted on another bracket immediately below bracket 80. Alongside of sprocket 81 is a second sprocket 82, these two sprockets being secured together so as to rotate as a unit. Sprocket 82 (and therefore sprocket 81) is driven by means of a chain 83 from driving sprocket 74 on motor shaft 72.

The bottles, while being acted upon by the wiping rotors 2 and 4 are turned or rotated on their own axes by means of a spinning chain 84. This chain is driven from a driving sprocket 85 from the lower end of a vertical shaft 60 which rotates at the same speed as vertical shaft 58 which drives conveyor 1. Driving sprocket 85 being larger in diameter than driving sprockets 55 for conveyor 1, the spinning chain 84 is operated in the same direction but at a higher linear speed than the chains 1a and 1b of conveyor 1.

The left hand end of spinning chain 84 is carried on a sprocket (not shown) which is mounted midway between sprockets 54 for chains 1a and 1b and on the same vertical shaft on which these two sprockets are mounted. Hence the slack in all three chains may be adjusted by the same adjusting mechanism.

It will be understood from the previous description, as well as from the drawings, particularly Fig. 6, that the vertical spacing and arrangement of conveyor chains 1a and 1b and the pocket fingers 49 carried whereby is such as to place the lower pocket fingers 49 in engagement with the bottles just above the supporting track 46, whereas the upper fingers 49 engage the bottles near the top of their body portions and just below the neck curvature. This spacing not only affords effective support for the sides of the bottles, but also provides room for spinning chain 84 substantially midway in the vertical direction between the chains 1a and 1b.

Alternate links of spinning chain 84 carry friction blocks 86 which extend vertically below and above chain 84 a sufficient distance to provide an adequate area of contact with the bottles to cause the bottles to turn in their pockets formed between adjacent pocket fingers 49, the bottles being urged against these friction blocks by the pressure of the wiping blades 34. These blocks may consist of automotive brake lining material.

The outer surfaces of friction blocks 86 are adjusted sufficiently to the left, as viewed in Fig. 6, to cause the reaction due to the flexed wiping blades 34 to be taken by the friction blocks rather than by the longitudinal surface of the L-shaped pocket fingers 49. To this end both sides or reaches of spinning chain 84 are outwardly braced by means of idler sprockets 87 appropriately spaced throughout the operative length of chain 84 (Fig. 4). These idler sprockets are yieldably and resiliently mounted as shown in Figs. 6, 3 and 4, each sprocket being carried by a vertical shaft 87a, the ends of which rotate in bearing brackets 88 having rod-like shanks 88a which are slidably mounted in apertures in the central part of the machine frame. Helical springs 88b surrounding these shanks bias the bearing brackets in a direction to urge sprockets 87 toward the back of spinning chain 84.

Both of the bottle rails 45 and 46 are placed at the same level to correspond with the two sides or reaches of the conveyor chains 1a and 1b and of the spinning chain 84. The wiping rotors 2 and 4, however, are mounted preferably at different elevations so that their blades will operate on different label areas of the bottles. Preferably also, wiping rotor 2 which cooperates with the incoming sides of the conveyor 1 is arranged to remove the labels from the upper label area, and wiping rotor 4 is arranged to remove the labels from the lower label area. Thus rotor 2 is mounted at a somewhat high elevation than rotor 4, as shown in Fig. 3, rotor 2 removing the neck labels and rotor 4 the side labels.

Referring now more particularly to Figs. 4 and 5, the bottles enter conveyor 1 on the front side of the apparatus substantially opposite its vertical driving shaft 58 and leave the conveyor at substantially the same position on the rear side of shaft 58. It is desirable to remove friction blocks 86 of spinning chain 84 from contact with the bottles as they enter and as they leave conveyor 1. Accordingly two flanged rollers 89 are arranged to coact with the friction blocks 86, one on each side of chain 84, so as to carry the two sides of the chain toward one another in the vicinity of driving shaft 58, thereby causing the friction blocks to recede from contact with the bottles both while they are fed into the conveyor and discharged therefrom. These flanged rollers 89 are mounted on laterally adjustable brackets 90 which in turn are supported on a vertical frame member 91 substantially midway between the two vertical driving shafts 58 and 60.

Rollers 89 serve an additional purpose since by adjusting their supporting brackets, the tautness of spinning chain 84 can be adjusted independently of the tautness of conveyor chains 1a and 1b.

The conveyor belt 19 which serves as a transfer and feed conveyor between tank 8 and the label removing apparatus carries the bottles between the side guides 19a and feeds them between pocket fingers 49 as they complete their rounding of driving sprockets 55. The bottles pass from the end of conveyor 19 onto a horizontal platform 92 across which they are moved diagonally between the bent end 93 of the inner guide 19a and a spring or resilient guide member 94. A portion of this guide is parallel to the end 93 and is secured at its right hand end to a bracket which is alined with the end of outer guide 19a. The left hand portion of guide member 94 is substantially parallel with the side of conveyor 1 and retains the bottles in their pockets until they reach the front end of wiping rotor 2.

The resiliency of member 94 urges the bottles into the respective pockets as the pocket fingers 49 move around sprockets 55 and close the open spaces between them to form the bottle pockets. Member 94 is provided with an adjustable stop indicated by reference numeral 95 to limit its outward movement. The bottles are fed forward over the horizontal plate 92 by the line pressure of the bottles on feed conveyor belt 19, this belt being operated at a linear speed which is greater than that of conveyors 9 and 1.

The delivery conveyor 96 is similar to conveyor 19 but is operated in the opposite direction by means of a pulley 97 and carries the delabeled bottles to the bottle washing machine. The bottles as they reach a position substantially opposite shaft 58 on the delivery side of the apparatus are stripped from the pockets in conveyor 1 by means of a bar 98 which may form the left hand end of one of the conveyor guides. The bottles move forward over a horizontal platform 99 onto conveyor belt 96.

Wiping rotors 2 and 4 are surrounded by hood-like casings 100 and 101, into the tops of which the sprayers 6 and 7 discharge. These serve to confine the mist or shower of water produced by the sprayers and the rotors and to direct the water at the bottom of the apparatus into a sloping collecting tray 102. The direction of rotation of the rotors is such as to carry the spray directly onto the labels. The water from collecting tray 102 is discharged into tank 103 at the left of the apparatus from which it may be recirculated by means of a suitable pump 104 through pipe 105 and control valve 106 to the sprayers 6 and 7. Tank 103 is provided with a strainer 107 on which the bits of paper, etc., removed from the bottles collect. This serves to clarify the water before it re-enters pump 104 and it serves also as a means of removing the paper refuse from the apparatus.

Returning now to describing the construction of tank conveyor 14, this conveyor comprises a series of cooperating endless conveyors 108, 109, 110 and 111. These four endless conveyors are driven in timed relation to one another at the same speed and provision is made for the bottles received from supply conveyor 9 to be transferred from one endless conveyor to the other until the bottles, after completing a horizontal serpentine path through tank 8, are discharged from endless conveyor 111 to transfer conveyor 19. The number of these endless conveyors 108—111 can be increased or decreased to provide the required length of travel and time of immersion as previously referred to.

This series of endless conveyors is carried by a series of driving sprockets 112 at one end of tank 8 and a series of idler sprockets 113 at the opposite end. Idler sprockets 113 are carried by vertical shafts 114 journaled at their lower ends in brackets fixed to the bottom of tank 8 and at their upper ends in a cross member 115. Driving sprockets 112 are similarly mounted on vertical shafts 116. Shafts 116 are journaled at their upper ends in a cross member 117 and immediately below this member there is a series of intermeshing spur gears 118, one of which is keyed to each of the respective shafts 116. These gears 118 are of the same diameter and consequently cause the rotation of each pair of adjacent shafts 116 in opposite directions but at the same speed.

In order to drive the conveying apparatus, one of the vertical shafts 116 is provided at its upper end with a beveled gear 119 which meshes with a second bevel gear 120 on a horizontal shaft 121. Shaft 121 has keyed to it sprocket 70 around which is trained the driving chain 69 previously referred to and which is driven by operating motor 65 through the reducing gearing 63.

Sprockets 112 and 113 which support endless conveyors 108—111 are all of the same diameter and are spaced on the same centers so that the sides or stretches of these conveyors are parallel to one another as shown in Fig. 2a. Each of the four endless conveyors is provided with L-shaped bottle-engaging members which form along the straight stretches of the conveyors open-sided bottle pockets. On the incoming conveyor 108 and the discharge conveyor 111 these pocket members are indicated by numeral 122, and on the intermediate conveyors 109 and 110 they are indicated by numeral 123. Pocket members 122 are considerably taller than pocket members 123 in order to engage the incoming bottles after they pass over the top of tank 8 along scuff plate 11 and onto the downwardly inclined supporting rail 12 and to push the bottles along this inclined rail as they are lowered into the liquid. For a similar reason such tall bottle-engaging members are required on the discharge conveyor 111 in order to push the bottles along the upwardly inclined rail 15.

The bottles, after passing over scuff plate 11, are delivered into the pockets between pocket members 122 of incoming conveyor 108 by means of star wheel 124. As they descend along the inclined supporting rail 12 they are held in the pockets by a side rail 125 and by an upper rail 126 which is desirable, particularly if the bottles do not receive a sufficient quantity of water from the spraying device 10 to cause them to sink readily below the surface 13 of the tank liquid. These guide rails 125 and 126 extend around the end of conveyor 108 as its swings around sprocket 112.

The bottle-engaging members 122 and 123 are provided with interfitting portions as shown in Fig. 2c and the adjacent endless conveyors are close enough together so that as the bottles travel between adjacent conveyors they are supported in part by each conveyor. That is to say, the chains are synchronized so that the pockets travel opposite one another so that each bottle is partly within a pocket of each chain.

As the bottles traveling between conveyors 108 and 109 reach the right hand end of tank 8 they are engaged by a stripping guide 127 which strips the bottles from the pockets of conveyor 8 and causes them to be carried entirely in the pockets of conveyor 109 as they travel around idler sprocket 113 supporting this conveyor. Then the bottles make another pass through the tank, being carried between adjacent conveyors 109 and 110. As they reach the left hand end of the conveyors, a stripping guide 128 removes them from conveyor 109 and guides them around sprocket 112 of conveyor 110 and in between conveyors 110 and 111. At the right hand end adjacent idler sprocket 113 of conveyor 111 a third stripping guide 129 removes the bottles from conveyor 110 and after passing around sprocket 113 they start upwardly along the inclined rail 15 on their discharge stretch. Along this stretch the bottles are retained in the pockets of conveyor 111 by means of a side guide 130 and a top guide 131 which are similar to guides 125 and 126 respectively.

By means of the present invention an apparatus has been devised which is of rugged construction to operate in the bottle line with and preceding the usual bottle washer or cleaning machine. It will handle the bottles at substantially the same speed or quantity per minute as such machines and removes from the bottles labels, paper napkins and other matter adhering thereto which have heretofore served to contaminate the treating solutions required by State laws to be used in the bottle washers.

Our delabeling apparatus maintains the bottles in upright position and, in so doing, causes them to retain any liquid which may have entered them while in label softening tank 8 or from sprayers 6 and 7. Even should the bottles be drained before reaching the washing machine their interiors will have been pre-wetted and partially soaked.

For the purpose of setting forth our invention, we have described in some detail one particular embodiment of the improved delabeling apparatus. It is to be understood, however, that our invention is not limited to the particular apparatus disclosed but that changes in the construction and also in the arrangement of the various parts can be made without departing from the spirit of the invention. For example, although the wiping rotor type of rotary scrubber is preferable because of its effective action, it will be understood that other forms of elongated rotary scrubbing devices may be employed without departing from the invention, and it is our intention that the scope of the invention shall be limited only by the existing prior art and the scope of the appended claims.

We claim:

1. In a bottle delabeling apparatus, a continuously moving endless conveyor adapted to move a plurality of bottles in a U-shaped path, the legs of said path being on opposite sides of the conveyor, a pair of elongated wiping rotors each having a plurality of wiping blades, one of said rotors cooperating with each side of said endless conveyor, means for rotating said wiping rotors to remove labels from the bottles as they are carried along by said conveyor, the wiping rotors on opposite sides of the conveyor being arranged to engage portions of said bottles at different distances from their bottoms whereby to remove labels from a plurality of label areas on the bottles.

2. In a bottle delabeling apparatus, two elongated horizontal rotary scrubbers mounted for rotation with their axes in spaced parallel relation, and an endless conveyor for continuously moving bottles into engagement with said rotary scrubbers, both reaches of said conveyor being disposed between said scrubbers and parallel thereto.

3. In a bottle delabeling apparatus, two elongated horizontal rotary scrubbers mounted for rotation with their axes in spaced parallel relation, a continuously moving endless conveyor carried by two driving sprockets rotating on vertical shafts for continuously moving bottles into engagement with said rotary scrubbers, both reaches of said conveyor being disposed between said scrubbers and parallel thereto, said conveyor having open pockets adapted to receive individual bottles and expose the sides thereof to the action of said scrubbers, means for continuously feeding the bottles into said pockets and continuously removing them from said pockets adjacent opposite sides of one of said conveyor sprockets, the bottles being carried around the sprocket at the opposite end of the conveyor and thereby subjected first to the action of one of said rotary scrubbers and subsequently to the action of the other of said rotary scrubbers.

4. In a bottle delabeling apparatus, two elongated horizontal rotary scrubbers mounted for rotation with their axes in spaced parallel relation, a continuously moving endless conveyor carried by two sprockets rotating on vertical shafts for continuously moving bottles into engagement with said rotary scrubbers, both reaches of said conveyor being disposed between said scrubbers and parallel thereto, the axis of one of said scrubbers being at a higher elevation than that of the other scrubber to cause them to act upon different label areas, means for continuously feeding the bottles into the pockets of said conveyor and continuously removing them therefrom adjacent opposite sides of one of said conveyor sprockets, the bottles being carried around the sprocket at the other end of the conveyor and thereby having their labels removed first from one of said label areas and subsequently from the other of said label areas.

5. In a delabeling apparatus, an elongated rotary scrubber, means for rotating the same, a conveyor for moving bottles lengthwise of said rotary scrubber comprising two vertically spaced endless chains each provided with pocket fingers maintained in vertical alinement to engage the bodies of the bottles and a spinning chain carrying friction blocks arranged to bear against the sides of the bottles to rotate them as they are moved by the conveyor in engagement with said rotary scrubbers, said spinning chain being operated at a different speed from the conveyor.

6. In a delabeling apparatus, an elongated rotary scrubber, means for rotating the same, a conveyor for moving bottles lengthwise of said rotary scrubber comprising two vertically spaced endless chains each provided with pocket fingers maintained in vertical alinement and spaced vertically to engage the bodies of the bottles near the top and bottom thereof, and a spinning chain carrying friction blocks arranged to bear against the sides of the bottles between said vertically spaced pocket fingers to rotate the bottles while they are engaged by said rotary scrubber, said spinning chain being driven at a different speed from the conveyor.

7. In a bottle delabeling apparatus, a continuously driven rotor having a plurality of substantially radial blades positioned substantially parallel with the rotor axis, a structure for supporting a bottle with its axis substantially at right angles to said rotor axis and in a position to bring the label on said bottle into the path of said rotating blades.

8. A bottle delabeling apparatus as set forth in claim 7 in which the blades of the rotor consist of stiff but not inflexible material to exert a hard rubbing action against the surface of the label.

9. A bottle delabeling apparatus as set forth in claim 7 in which the blades of the rotor have a thickening edge forming a rib which acts to tear the edge of the label from the bottle.

10. In a bottle delabeling apparatus, a continuously driven elongated rotor having a plurality of substantially radial blades extending lengthwise thereof, a structure for supporting a row of bottles with the horizontal line passing through the upper edges of the labels on said bottles parallel with the axis of said rotor and to bring said labels into the path of said rotating blades, said blades consisting of stiff but not inflexible material to exert a hard rubbing action against said labels, and said blades also having equally spaced transverse cuts extending inwardly from their edges and dividing each blade from end to end into a series of sections each of about the same extent as the diameter of the bottles.

11. In a bottle delabeling apparatus, an elongated rotor having a plurality of elongated wiping blades extending longitudinally of the rotor, means for rotating the same, and a conveyor for continuously moving the bottles lengthwise of the rotating elongated wiping rotor with the sides of the bottles in engagement therewith to cause the labels to be wiped from the bottles.

12. In a bottle delabeling apparatus, an elongated rotor having a plurality of elongated wiping blades extending longitudinally of the rotor, means for rotating the same, means for applying a softening liquid to soften the labels on the bottles and a conveyor for continuously moving the bottles lengthwise of the rotating elongated wiping rotor with the sides of the bottles in engagement therewith to cause the softened labels to be wiped from the bottles, said conveyor including mechanism for turning the bottles to cause their entire peripheries to be exposed to the action of the wiping blades.

13. In a bottle delabeling apparatus, a continuously moving conveyor adapted to move a plurality of bottles in a straight path and having pockets adapted to receive individual bottles and support them with their axes at substantially right angles to the direction of movement, said pockets being open at one side and adapted to receive individual bottles and expose the sides thereof, an elongated rotor having a plurality of wiping blades positioned parallel with said path and adjacent thereto to engage the bottles and hold them in their pockets as they are moved by the conveyor, means for applying a softening liquid to soften the labels on the bottles and means for rotating said rotor to remove the labels.

14. In a bottle delabeling apparatus, a continuously moving conveyor adapted to move a plurality of bottles in a straight path and having pockets adapted to receive individual bottles and support them with their axes at substantially right angles to the direction of movement, said pockets being open at one side and adapted to receive individual bottles and expose the sides thereof, an elongated rotor having a plurality of wiping blades positioned parallel with said path and adjacent thereto to engage the bottles and hold them in their pockets as they are moved by the conveyor, means for applying a softening liquid to soften the labels on the bottles, means for rotating said rotor to remove the labels, and mechanism for turning the bottles as they are moved along said path to cause their entire peripheries to be exposed to the action of the wiping blades.

15. In a bottle delabeling apparatus, a continuously moving endless conveyor adapted to move a row of bottles in each of two straight paths on opposite sides of the conveyor, a pair of elongated wiping rotors each having a plurality of wiping blades, one of said rotors cooperating with each side of said endless conveyor, and means for rotating said wiping rotors to remove labels from the bottles of each of said rows simultaneously as they are carried along said conveyor.

16. In a bottle delabeling apparatus, a continuously moving conveyor adapted to move a plurality of bottles in a straight path and having pockets adapted to receive individual bottles and support them with their axes at substantially right angles to the direction of movement, said pockets being open at one side and constructed and arranged to receive individual bottles and expose the sides thereof, an elongated rotary scrubber positioned parallel with said path and adjacent thereto engaging the bottles and holding them in their pockets as they are moved by the conveyor, and mechanism for turning the bottles as they are moved along said path to cause the entire peripheries to be exposed to the action of the rotary scrubber, and means for rotating said scrubber to remove the labels.

17. In a bottle delabeling apparatus, an elongated rotary scrubber, means for rotating the same, a conveyor for continuously moving the bottles lengthwise of said rotary scrubber with the sides of the bottles in engagement therewith, a horizontal stationary rail arranged at a suitable elevation above the conveyor to engage the necks of the bottles as they are moved by the conveyor, said neck rail and said conveyor being adapted to provide the reaction of the pressure of the rotary scrubbers to maintain the bottles in engagement therewith.

18. In a delabeling apparatus, a horizontal elongated rotary scrubber, means for rotating the same, a horizontal supporting rail arranged at the side of said rotary scrubber and parallel therewith for supporting bottles in engagement with said scrubber, and a conveyor for continuously moving the bottles lengthwise of said rail, said conveyor being adapted to expose the sides of said bottles and to maintain them in engagement with the rotary scrubber.

19. In a delabeling apparatus, a horizontal elongated rotary scrubber, means for rotating the same, a horizontal supporting rail arranged at the side of said rotary scrubber and parallel therewith for supporting bottles in engagement with said rotary scrubber, and a conveyor for continuously moving the bottles lengthwise of said rail, said conveyor having pocket fingers forming pockets for individual bottles to expose the sides of the bottles to the action of said rotary scrubbers as they move along said supporting rail and maintaining the bottles in spaced relation to one another to facilitate action of the rotary scrubbers in removing the labels therefrom.

WALLACE D. KIMBALL.
JOHN F. CURRIVAN.
JOHN H. MOSLEY.

REFERENCES CITED

The following references are of record in the file of this patent:

UNITED STATES PATENTS

| Number | Name | Date |
| --- | --- | --- |
| Re. 11,175 | Merrill | July 17, 1891 |
| 885,912 | Chilton | Apr. 28, 1908 |
| 973,178 | Dawson | Oct. 18, 1910 |
| 1,214,278 | Cole | Jan. 30, 1917 |
| 1,273,603 | Gallup et al. | July 23, 1918 |
| 1,609,035 | Nixon | Nov. 30, 1926 |
| 1,782,018 | Staines | Nov. 18, 1930 |
| 2,051,090 | Ladewig et al. | Aug. 18, 1936 |
| 2,219,007 | Dostal | Oct. 22, 1940 |